(12) United States Patent
Barman et al.

(10) Patent No.: US 7,835,354 B2
(45) Date of Patent: Nov. 16, 2010

(54) MODELING BROADCAST, MULTICAST, POINT TO POINT, AND HANDSHAKE COMMUNICATIONS OVER THE SAME CHANNEL IN A SPIN MODEL CHECKER

(75) Inventors: Kuntal Das Barman, Bangalore (IN); Debapriyay Mukhopadhyay, West Bengal (IN)

(73) Assignee: Honeywell International Inc., Morristown, NJ (US)

( * ) Notice: Subject to any disclaimer, the term of this patent is extended or adjusted under 35 U.S.C. 154(b) by 716 days.

(21) Appl. No.: 11/611,244

(22) Filed: Dec. 15, 2006

(65) Prior Publication Data

US 2008/0144616 A1    Jun. 19, 2008

(51) Int. Cl.
*H04L 12/28* (2006.01)
*H04L 12/413* (2006.01)
*H04J 3/26* (2006.01)

(52) U.S. Cl. ............... 370/389; 370/432; 370/445
(58) Field of Classification Search ............ None
See application file for complete search history.

(56) References Cited

U.S. PATENT DOCUMENTS 4,532,626 A * 7/1985 Flores et al. ............ 370/438
5,291,490 A * 3/1994 Conti et al. ............ 370/392
2005/0190784 A1 * 9/2005 Stine ..................... 370/445

OTHER PUBLICATIONS

R. De Renesse et al., "Formal Verification of Ad-Hoc Routing Protocols Using SPIN Model Checker", IEEE Melecon, 2004, pp. 1-6.
H. E. Jensen et al., "Modelling and Analysis of a Collision Avoidance Protocol Using SPIN and UPPAAL", SPIN 1996, pp. 1-17.
Michiel Van Osch et al., "Finite-State Analysis of the CAN Bus Protocol", Proceedings of Sixth IEEE International Symposium on High Assurance Systems Engineering, HASE 2001, pp. 1-11.

* cited by examiner

*Primary Examiner*—Chirag G Shah
*Assistant Examiner*—Srinivasa R Reddivalam
(74) *Attorney, Agent, or Firm*—Schiff Hardin LLP

(57) ABSTRACT

Module identifying bits corresponding to the modules of a communication network are used to indicate whether a communication is a broadcast communication to all modules in the communication network, a multicast communication to more than one but not all modules in the communication network, or a point-to-point communication to a specific module in the communication network. In addition, a handshake session is also indicated.

6 Claims, 3 Drawing Sheets

MODELING BROADCAST, MULTICAST, POINT TO POINT, AND HANDSHAKE COMMUNICATIONS OVER THE SAME CHANNEL IN A SPIN MODEL CHECKER

TECHNICAL FIELD

This technical field of the present application relates to the specification and modeling of broadcast, multicast, point to point, and handshake communications over the same channel.

BACKGROUND

Model checkers are tools that permit automatic model checking. Model checking typically verifies formal systems algorithmically. Formally specified models are fed into the model checkers, and the model checkers generate the state space that the model will traverse in its original run. Verifying any property of that model reduces to finding a path to reach a bad state from the initial state. A common problem faced by explicit state model checkers is a combinatorial blow up of the state space, commonly known as state space explosion.

The Spin model checker provides a specification language Promela. The Spin model checker is an efficient verification system for models of distributed software systems. It has been used to detect design errors in applications ranging from high-level descriptions of distributed algorithms to detailed code for controlling telephone exchanges.

Promela is a verification modeling language. It provides a way for making abstractions of distributed systems. The Spin model checker is frequently used to fractionally verify process behaviors that are considered suspect. A complete verification is, therefore, typically performed in a series of steps, with the construction of increasingly detailed Promela models. Each model can be verified with the Spin model checker under different types of assumptions about the environment. Once the correctness of a model has been established with the Spin model checker, that fact can be used in the construction and verification of all subsequent models.

Promela programs typically consist of processes, message channels, and variables. Processes are global objects that represent the concurrent entities of the distributed system. Message channels and variables can be declared either globally or locally within a process. The Promela syntax has a special data type, called "chan," that may be used to model communication channels.

This "chan" data type allows the specification of two different types of communications, asynchronous (point to point) and synchronous (handshake). Point to point communications involve communications between two specific points or nodes. A handshake communication typically occurs at the beginning of a session between communicating entities. The handshake ensures that the two entities agree on how the transmission will proceed between them. Accordingly, in a handshake (or synchronous) communication between a single transmitter and a single receiver, the transmitter must wait for the receiver to receive the message from the channel before the transmitter can continue operation.

However, this "chan" data type has not been used to model either broadcast or multicast communications. Broadcast communications involve the transmission of a signal to the entire set of recipients in the system or service area. Multicast communications involve the transmission of a signal to a selected sub-set of recipients who belong to the appropriate multicast group.

In the literature, there have been references to the modeling of broadcast or multicast communications using a shared variable, but there have been no references to the modeling of all four types of communications, i.e., point to point communications, broadcast communications, multicast communications, and handshake communications, using the same channel. However, as a practical matter, all four type of communications do take place over the same channel.

More specifically, R. de Renesse and A. H. Aghvami, in "Formal Verification of Ad-Hoc Routing Protocols Using Spin Model Checker," IEEE Melecon, 2004, modeled broadcast communications using as many channels as the number of processes. Thus, the common bus was replaced by several "point to point" channels, and a broadcast packet was transmitted synchronously through all channels. This modeling technique significantly increased the state space.

Henrik Ejersbo Jensen, Kim G. Larsen and Arne Skou, in "Modeling and Analysis of a Collision Avoidance Protocol using SPIN and UPPAAL," SPIN 1996, considered a similar model with a separate process for the bus. That process ensures different types of communications using different flags. In effect, the bus is replaced by several "point to point" channels. Therefore, a common shared bus is not modeled in its true sense.

Michiel van Osch and Scott A. Smolka, in "Finite-State Analysis of the CAN Bus Protocol," Proceedings of Sixth IEEE International Symposium on High Assurance Systems Engineering, HASE 2001, modeled the broadcast communication using a shared variable for the bus. This modeling technique does not blow up the state space, but it does not use the channels. Therefore, this modeling technique cannot be used to model handshake communications.

A model is disclosed herein that permits point to point communications, broadcast communications, multicast communications, and/or handshake communications using the same channel.

SUMMARY OF THE INVENTION

According to one aspect of the present invention, a method is performed by a module in a communication network. The method comprises the following: setting module identifying bits corresponding to all other modules in the communication network to a packet receiving value when the packet is to be transmitted in a broadcast communication; setting module identifying bits corresponding to more than one but not all other modules in the communication network to a packet receiving value when the packet is to be transmitted in a multicast communication; and, setting module identifying bits corresponding to only one of the modules in the communication network to a packet receiving value when the packet is to be transmitted in a point-to-point communication.

According to another aspect of the present invention, a method is performed by a module in a communication network. The method comprises the following: receiving a packet from a channel; determining whether a module identifying bit corresponding to the module is set to a value indicating that the module is to process the packet; and, determining whether a module identifying bit corresponding to another module in the communication network is set to a value indicating that the other module is to process the packet.

According to yet another aspect of the present invention, a computer readable medium has program code stored thereon. The program code, when executed, performs the following functions: in a send mode, setting module identifying bits corresponding to at least second, third, and fourth modules in a communication network to a packet receiving value when a packet is to be transmitted in a broadcast communication; in the send mode, setting module identifying bits corresponding to more than one but not all of the first, second, and third modules in the communication network to a packet receiving value when a packet is to be transmitted in a multicast communication; in the send mode, setting module identifying bits corresponding to only one of the first, second, and third modules in the communication network to a packet receiving value when a packet is to be transmitted in a point-to-point communication; in a receive mode, receiving a packet from a channel; in the receive mode, determining whether a module identifying bit that is associated with the received packet and that corresponds to the first module is set to a value indicating that the first module is to process the packet; and, in the receive mode, determining whether a module identifying bit that is associated with the received packet and that corresponds to at least one of the second, third, and fourth modules in the communication network is set to a value indicating that the at least one of the second, third, and fourth modules is to process the packet.

BRIEF DESCRIPTION OF THE DRAWINGS

These and other features and advantages will become more apparent from the detailed description when taken in conjunction with the drawings in which.

DETAILED DESCRIPTION

Let it be assumed that there are n processes that communicate with one another using a shared bus, and let it further be assumed that point to point communications, broadcast communications, multicast communications, and handshake communications are possible between these n processes. Accordingly, all four communication types are possible between the n processes. The parameter n can have any value greater than or equal to 2.

As an example, in an A380 Secondary Power Distribution System, the software that runs on the network is Generic Bootloader (GBL) software. The network includes several line replacement modules (or LRMs). Each LRM executes the same copy of GBL software. Examples of such LRMs are acdc, gfi, and gateway.

Figure 2:
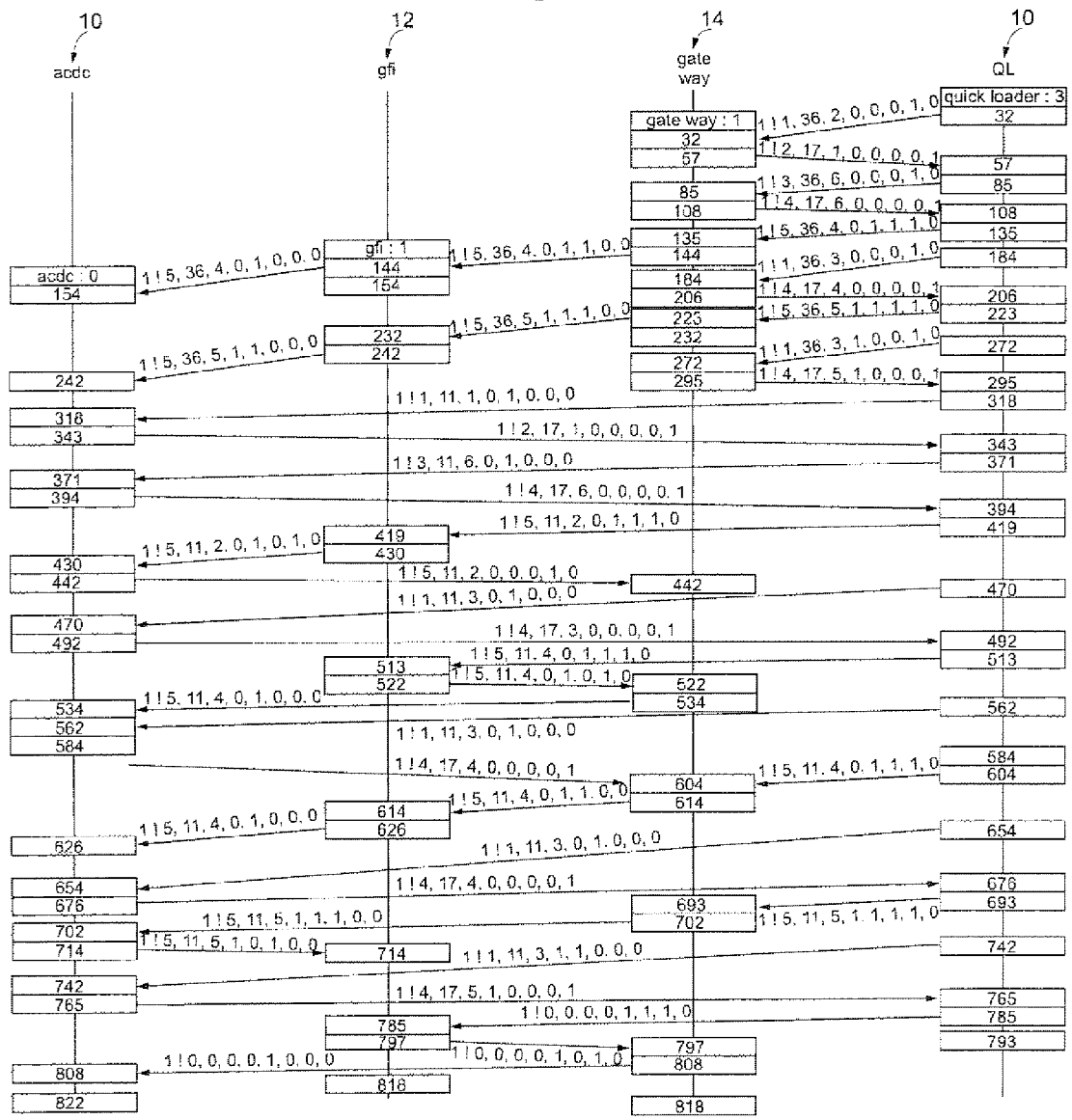
FIG. 2 illustrates example communications between the modules of the network of FIG. 1.

The acdc, gfi, gateway LRMs are connected to a shared RS432 bus. Quickloader, another module, is also connected to the same bus. On "power on" each of the LRMs verifies that the correct software is installed in them. This software is different for different LRMs. If the correct software is not present or not properly present in an LRM, the corresponding LRM uploads the correct software from Quickloader. To upload the correct software from the Quickloader, an LRM needs to communicate with Quickloader. An example of a communication protocol between LRMs (acdc, gfi, gateway) and Quickloader according to an embodiment of the present invention is shown in FIG. 2.

Figure 1:
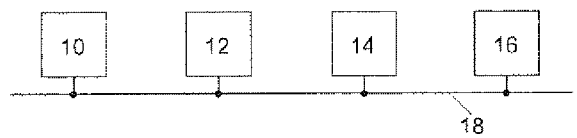
FIG. 1 shows an example network.

FIG. 1 illustrates the network which the four modules 10, 12, 14, and 16 coupled to a channel 18. The modules 10, 12, 14, are line replacement modules such as acdc, gfi, and gateway. The module 16 is Quickloader. The channel 18, for example, can be the shared RS432 bus mentioned above.

When the power is switched on in the network, each LRM uploads the GBL software. The GBL software is available from the Quickloader Module 16 also included in the network. To upload the GBL software, each LRM, such as one of the modules 10, 12, and 14, communicates with the Quickloader Module 16. These communications can include point to point, handshake, multicast and broadcast communications. These modules (LRMs and Quickloader) represent different processes.

Each time a packet is sent to the channel (representing the bus), n extra module identifying bits are added to the packet such as at the end of the packet. Each of these extra module identifying bits represents a corresponding one of the n processes. In other words, for each process, an extra module identifying bit is added to each packet. If the module identifying bit corresponding to one of the processes is set (i.e., on), the packet is meant for that process. If the packet is not meant for that process, the corresponding module identifying bit is not set (i.e., off).

FIG. 2 illustrates a sequence of communications over a single channel between the four modules 10, 12, 14, and 16. As indicated above, the modules 10, 12, 14, and 16, for example, may be acdc, gfi, gateway, and Quickloader, respectively, and are represented by four vertical lines. The lines with arrowheads represent communications between the modules 10, 12, 14, and 16, and the arrowhead shows the direction of the corresponding communication from a sender module to a receiver module.

Associated with each communication is an information packet. Using the communication 318 as an example, the packet is sent from the module 16 to the module 10. The packet is given as "1!1,11,1,0,1,0,0,0". The first number (in this case, 1) represents the channel number. Since only one channel is used for the communications between the modules 10, 12, 14, and 16, this first number is always 1.

After the exclamation mark "!", the content of the packet is written. In this example, the first four numbers are the information content of the packet. Therefore, in the example 1,11, 1,0 are the information content of the packet. The last four numbers in the packet are the module identifying bits each of which represents a corresponding one of the four modules 10, 12, 14, and 16. Therefore, in the above example, 1,0,0,0 are the four module identifying bits added at the end of the packet to correspond with the four modules 10, 12, 14, and 16. Thus, 1,0,0,0 means that the packet is meant for the module 10 only. In other words, this example communication is a point to point communication. If, on the other hand, this packet were a broadcast packet sent by the module 12, then the four module identifying bits of the packet would have been 1,0,1, 1, signifying that the packet is meant for all modules in the network except for the sender module, i.e., the module 12.

In case of a multicast communication, the last four bits of the packet (i.e., the module identifying bits) might have been 1,0,0,1, signifying that the packet is meant for plural but fewer than all modules in the network.

One more extra flag (or bit), which may be designated CHANNEL_FULL, can be added as desired to show that the channel (or bus) is empty or not. The CHANNEL_FULL bit acts as a shared variable. In the case of a handshake communication, this CHANNEL_FULL bit need not be set because the handshake communication is synchronous. In the case of the other communication types, however, the CHANNEL_ FULL bit is set as soon as a packet is sent to the channel. The CHANNEL_FULL bit remains set until all receivers have received the packet.

The communicating modules set the CHANNEL_FULL bit. Thus, whenever a module sends a packet to the shared bus in case of any communication other than handshake communication, that module sets the CHANNEL_FULL bit on. The receiver module of the communication, on receiving the packet, sets the CHANNEL_FULL bit off. In case where multiple modules are to receive the packet, the last module sets the CHANNEL_FULL bit off after receiving the packet.

It is implicit that, while the CHANNEL_FULL bit is on (the channel is full), no other module can use the channel to send a new packet and modules can only read the channel. Thus, no communication by a module other than the module that set the CHANNEL_FULL bit is possible over the channel while the CHANNEL_FULL bit is set.

If the channel is empty, in other words if the CHANNEL_FULL bit is off, the handshake packet can be sent in the usual way as permitted by SPIN. If the channel is not empty, in other words if the CHANNEL_FULL bit is on, a module must wait to send the handshake packet until the bit if off.

A module receives a packet from the bus if the packet is destined for it, i.e., if its module identifying bit is set. After this module receives the packet, the module checks whether the packet has to be received by some other module, i.e., whether any of the other module identifying bits are set. If so, the module sends the same packet back to the bus. Otherwise, the module sets the CHANNEL_FULL bit to its off state. In either case, the module sets its own module identifying bit to the off state.

Figure 5:
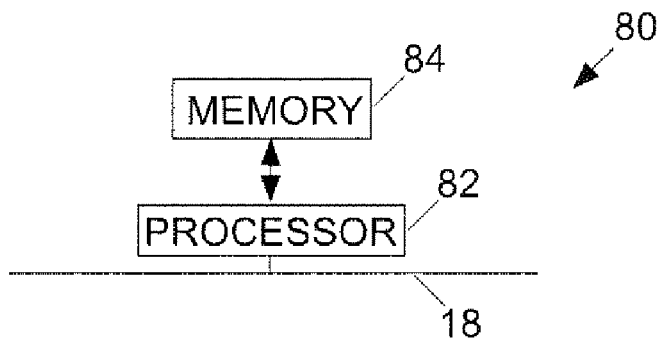
FIG. 5 illustrates a processor and a memory that are used by a module to carry out communications as described below.

As shown in FIG. 5, Each module contains apparatus 80 that includes, inter alia, a processor 82 and memory 84 permitting it to execute the functions described above.

Figure 3:
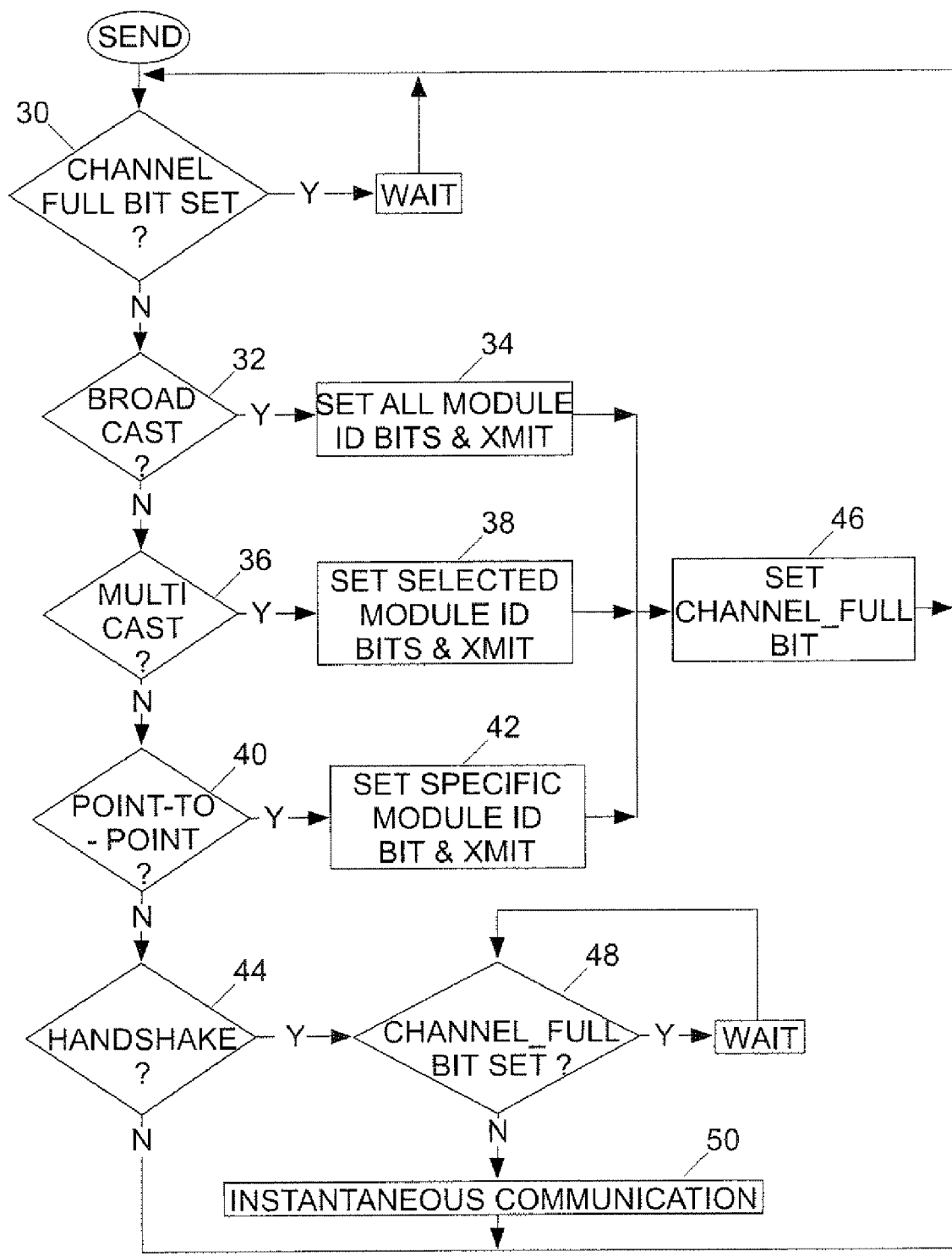
FIG. 3 illustrates the operation of a module when in the send mode.

When a module is to send a packet, it enters a send mode illustrated in FIG. 3. This send mode may be executed by the processor 80 in accordance with software stored in the memory 84. Thus, at 30, the module, which has a packet to communicate to one or more other modules, determines whether the CHANNEL_FULL bit is set. If the CHANNEL_FULL bit is set, the module waits until the CHANNEL_FULL bit is not set.

When the CHANNEL_FULL bit is not set, the module at 32 determines whether the packet is meant for all other modules in the network. If the packet is meant for all other modules in the network, the module at 34 sets of module identifying bits corresponding to all of the other modules to 1 and transmits the packet.

If the module determines at 32 that the packet is not meant for all other modules in the network, the module at 36 determines whether the packet is meant for a sub-set of the modules in the network. If the packet is meant for a sub-set of the modules in the network, the module at 38 sets of module identifying bits corresponding to all modules in the sub-set to 1 and transmits the packet.

If the module determines at 36 that the packet is not meant for a sub-set of the modules in the network, the module at 40 determines whether the packet is meant for a specific one of the modules in the network. If the packet is meant for a specific one of the modules in the network, the module at 42 sets of module identifying bit corresponding to the specific one of the modules in the sub-set to 1 and transmits the packet.

After the module at 34 sets the module identifying bits corresponding to all of the other modules to 1 and transmits the packet, or after the module at 38 sets of module identifying bits corresponding to all modules in the sub-set to 1 and transmits the packet, or after the module at 42 sets of module identifying bit corresponding to the specific one of the modules in the sub-set to 1 and transmits the packet, the module at 46 sets the CHANNEL_FULL bit to on.

If the module determines at 40 that the packet is not meant for a specific one of the modules in the network, the module at 44 determines whether the packet is to be communicated using a handshake protocol. If so, the module at 48 checks whether the channel is busy or not, in other words whether the CHANNEL_FULL bit is on or off. If the channel is busy, then the module waits until the channel becomes free. When the channel is free, the module at 50 sends the packet and the receiver node receives the packet instantaneously. In this case there is no need to set the CHANNEL_FULL bit.

Figure 4:
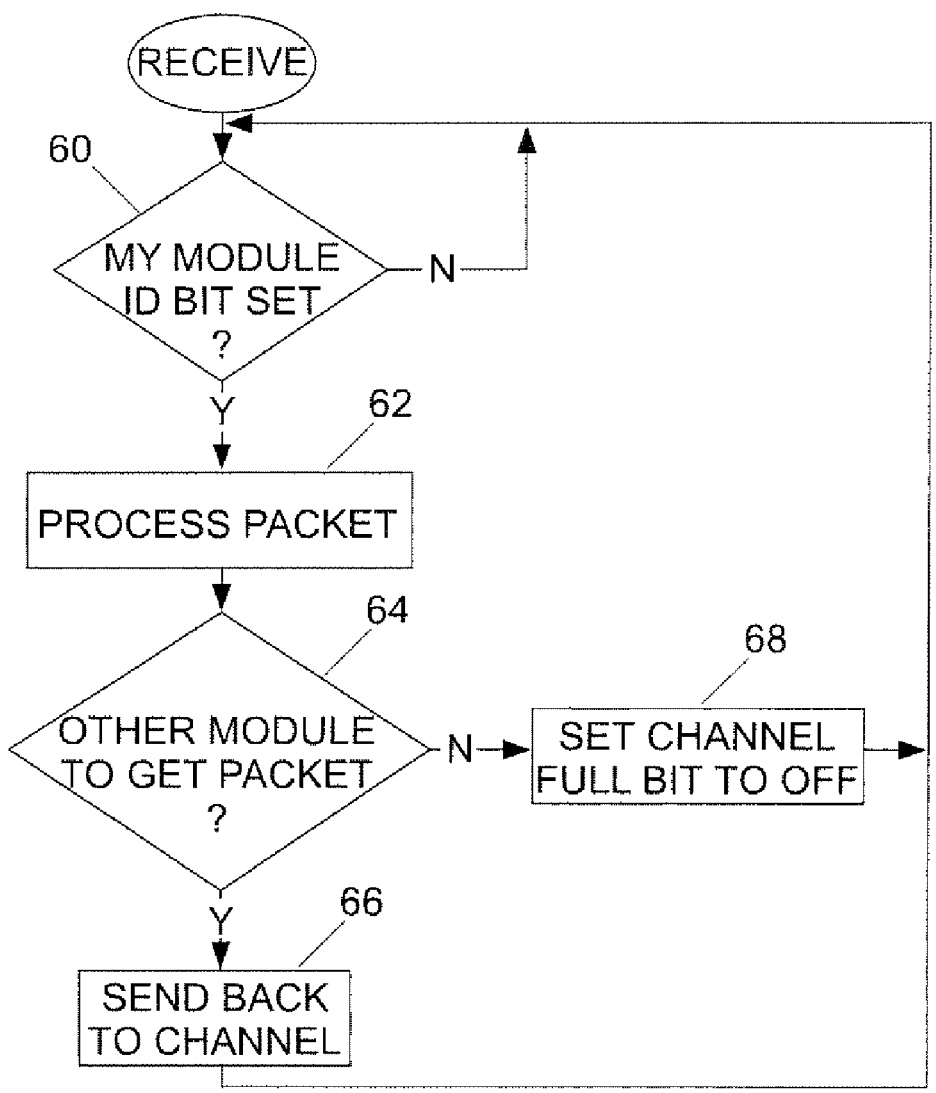
FIG. 4 illustrates the operation of a module when in the receive mode.

When a module is not in the send mode, it is in a receive mode illustrated in FIG. 4. Thus, at 60, the module determines whether its module identifying bit in any communication on the channel 18 is set. If not, the module simply waits for a communication in which its module identifying bit is set.

When the module detects at 60 that its module identifying bit is set, the module at 62 begins processing the corresponding packet. Also, the module at 64 determines whether the packet is to be received by any other modules in the network.

If so, the module at 66 sets its module identifying bit off (to 0 in the example described herein) and sends the packet back to the channel 18 so that the packet can be communicated to the next module.

However, if the module at 64 determines that there are no other modules to receive the packet, the module at 68 sets the CHANNEL_FULL bit to off.

As an example, a broadcast packet sent by Quickloader (the module 16) to all LRMs (modules 10, 12, and 14) might have the following construction: 1!5,36,4,0,1,1,1,0. The last four bits are the module identifying bits. Since the bits are set to 1,1,1,0, this packet is meant for all three LRMs (modules 10, 12, and 14). The module 14 first receives the packet, processes the packet, sets its module identifying bit off, and sends the packet back to the channel. Thus, the packet becomes 1!5,36,4,0,1,1,0,0. The module 12 then receives the packet, processes the packet, sets its module identifying bit off, and sends the packet back to the channel. Thus, the packet becomes 1!5,36,4,0,1,0,0,0. Finally, the module 10 receives the packet, processes the packet, and sets its module identifying bit off. Thus, the packet becomes 1!5,36,4,0,0,0,0,0. Because the last four bits are now 0,0,0,0, the packet is not destined for any module. The module 10 accordingly sets the CHANNEL_FULL bit off.

Handshake communications are handled in the usual way that SPIN handles such communications.

The modeling technique described herein provides an easier way to model the practical channels which are in use in industry, like the CAN bus, the RS485 bus, etc. This modeling technique helps to model a lot more channels or communications between module without blowing up the state space.

Accordingly, the modeling technique described herein specifies the common shared bus between several modules for different types of inter-process communications using only one channel. In case of the Spin model checker, this channel can be specified using the already available data type "chan" in Promela.

Broadcast, multicast, point to point, and handshake communications are thus modeled by adding extra module identifying bits, representing the modules, such as at the end of the packet. If the module identifying bit corresponding to a module is on, the packet is meant for that module.

Though the modeling technique described herein has been tested in the SPIN Model Checker, this modeling technique can be applied to other explicit state model checkers with similar constructs.

Certain modifications of the present invention have been discussed above. Other modifications of the present invention will occur to those practicing in the art of the present invention. Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A method performed by a module of transmitting a transmit packet over a shared channel, the transmit packet including module identifying bits and at least one CHANNEL_FULL bit, the module identifying bits identifying other modules in communication with the shared channel, the CHANNEL_FULL bit indicating whether the shared channel is full, the method comprising:
   setting module identifying bits corresponding to all of the other modules to a packet receiving value when the transmit packet is to be transmitted in a broadcast communication;
   setting module identifying bits corresponding to more than one but not all of the other modules to a packet receiving value when the transmit packet is to be transmitted in a multicast communication;
   setting module identifying bits corresponding to only one of the other modules to a packet receiving value when the transmit packet is to be transmitted in a point-to-point communication;
   setting the CHANNEL_FULL bit of the transmit packet to a value indicating that the shared channel is full;
   transmitting the transmit packet over the shared channel;
   receiving a received packet; and,
   setting the CHANNEL_FULL bit in the received packet to a value indicating that the shared channel is empty if no other module is to receive the received packet.

2. The method of claim 1 further comprising:
   determining whether a CHANNEL_FULL bit in the received packet is set to a value indicating that the shared channel is full;
   if the CHANNEL_FULL bit is not set to a value indicating that the shared channel is full, transmitting the transmit packet; and,
   if the CHANNEL_FULL bit in the received packet is set to a value indicating that the shared channel is full, not transmitting the transmit packet.

3. A method performed by a module of transmitting a transmit packet over a shared channel, the transmit packet including module identifying bits and at least one CHANNEL_FULL bit, the module identifying bits identifying other modules in communication with the shared channel, the CHANNEL FULL bit indicating whether the shared channel is full, the method comprising:
   conducting a synchronous handshake session over the shared channel;
   setting module identifying bits corresponding to all of the other modules to a packet receiving value when the transmit packet is to be transmitted in a broadcast communication;
   setting module identifying bits corresponding to more than one but not all of the other modules to a packet receiving value when the transmit packet is to be transmitted in a multicast communication;
   setting module identifying bits corresponding to only one of the other modules to a packet receiving value when the transmit packet is to be transmitted in a point-to-point communication;
   setting a CHANNEL_FULL bit of the transmit packet to a value indicating that the shared channel is full;
   asynchronously transmitting the packet over the shared channel;
   receiving a received packet; and,
   setting the CHANNEL_FULL bit in the received packet to a value indicating that the shared channel is empty if no other module is to receive the received packet.

4. The method of claim 3 further comprising:
   determining whether a CHANNEL_FULL bit in the received packet is set to a value indicating that the shared channel is full;
   if the CHANNEL_FULL bit is not set to a value indicating that the shared channel is full, transmitting the transmit packet; and,
   if the CHANNEL_FULL bit in the received packet is set to a value indicating that the shared channel is full, not transmitting the transmit packet.

5. The method of claim 3 wherein the conducting of a synchronous handshake session over the shared channel comprises transmitting a handshake packet having a CHANNEL_FULL bit that is not set to a value indicating that the shared channel is full.

6. The method of claim 5 further comprising:
   determining whether a CHANNEL_FULL bit in the received packet is set to a value indicating that the shared channel is full;
   if the CHANNEL_FULL bit is not set to a value indicating that the shared channel is full, transmitting the transmit packet; and,
   if the CHANNEL_FULL bit in the received packet is set to a value indicating that the shared channel is full, not transmitting the transmit packet.

* * * * *